(12) United States Patent
Alberte, Jr. et al.

(10) Patent No.: US 9,781,613 B2
(45) Date of Patent: Oct. 3, 2017

(54) SYSTEM AND METHOD FOR PROACTIVE COMMUNICATION NETWORK MANAGEMENT BASED UPON AREA OCCUPANCY

(71) Applicant: General Electric Company, Schenectady, NY (US)

(72) Inventors: Robert J. Alberte, Jr., Milwaukee, WI (US); Bruce A. Friedman, Jasper, GA (US); Paul R. Brozowski, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 50 days.

(21) Appl. No.: 14/919,918

(22) Filed: Oct. 22, 2015

(65) Prior Publication Data

US 2017/0118659 A1    Apr. 27, 2017

(51) Int. Cl.
*H04W 24/02* (2009.01)
*H04W 8/00* (2009.01)
(Continued)

(52) U.S. Cl.
CPC ........ *H04W 24/02* (2013.01); *G06K 9/00295* (2013.01); *G06K 9/00369* (2013.01);
(Continued)

(58) Field of Classification Search
CPC ... A61B 5/021; A61B 5/04325; A61B 5/0816; H04L 12/282; H04L 12/2823;
(Continued)

(56) References Cited

U.S. PATENT DOCUMENTS 6,600,421 B2   7/2003 Freeman
7,129,836 B2   10/2006 Lawson et al.
(Continued)

FOREIGN PATENT DOCUMENTS

WO   2013128081 A1   9/2013
WO   2014016705 A2   1/2014

OTHER PUBLICATIONS

International Search Report and Written Opinion for PCT/US2016/055341, mail date Jan. 24, 2017, 13 pages.

*Primary Examiner* — Mohamed Kamara
(74) *Attorney, Agent, or Firm* — Boyle Fredrickson, S.C.

(57) ABSTRACT

In the present invention, a communication network management system and method is provided that includes a central processing unit (CPU) including an individual and device recognition analysis engine located within the system on computer-readable-medium having the analysis instructions stored thereon in a non-transitory manner, a recognition device operably connected to the CPU and analysis engine and a transceiver configured to transmit and receive wireless signals between the CPU and various patient care devices located within a coverage area defined by the transceiver. The analysis engine receives information from the recognition device regarding the occupancy of the coverage area and identifies the individuals and devices occupying the coverage area to determine the adequacy of the network to accommodate the potential usage and interference levels resulting from the coverage area occupancy. The system can then alter the network configuration to provide adequate bandwidth and signal strength for the coverage area, as necessary.

20 Claims, 4 Drawing Sheets

(51) Int. Cl.
*H04B 17/382* (2015.01)
*H04L 12/923* (2013.01)
*G06K 9/00* (2006.01)

(52) U.S. Cl.
CPC ......... *H04B 17/382* (2015.01); *H04L 47/762* (2013.01); *H04W 8/005* (2013.01)

(58) Field of Classification Search
CPC ......... H04L 41/14; H04L 47/10; H04L 47/14; H04L 47/25; H04L 5/06; H04L 41/142; H04W 4/02; H04W 24/08
See application file for complete search history.

(56) References Cited

U.S. PATENT DOCUMENTS

| | | | |
|---|---|---|---|
| 7,920,061 B2 | 4/2011 | Klein et al. | |
| 8,199,000 B2 | 6/2012 | Ross et al. | |
| 8,258,965 B2 | 9/2012 | Reeder et al. | |
| 8,315,224 B2 | 11/2012 | Hoctor et al. | |
| 8,488,499 B2 | 7/2013 | Frigo et al. | |
| 8,510,255 B2 | 8/2013 | Fadell et al. | |
| 8,565,080 B2 * | 10/2013 | Kavanaugh | H04W 48/06 370/230 |
| 8,606,727 B2 | 12/2013 | Wu et al. | |
| 9,092,834 B2 | 7/2015 | Tolmie et al. | |
| 2003/0190892 A1 | 10/2003 | Shimada et al. | |
| 2004/0001467 A1 | 1/2004 | Cromer et al. | |
| 2005/0135313 A1 | 6/2005 | Gandhi et al. | |
| 2007/0192065 A1 | 8/2007 | Riggs et al. | |
| 2010/0015926 A1 | 1/2010 | Luff | |
| 2010/0216424 A1 | 8/2010 | Gans | |
| 2011/0196693 A1 * | 8/2011 | Hargrove | A61N 1/36014 705/2 |
| 2011/0305376 A1 | 12/2011 | Neff | |
| 2012/0020216 A1 | 1/2012 | Vashist et al. | |
| 2012/0303413 A1 | 11/2012 | Wang et al. | |
| 2014/0018637 A1 * | 1/2014 | Bennett | A61N 2/02 600/301 |
| 2015/0137997 A1 * | 5/2015 | Huang | A61B 5/1112 340/870.09 |

* cited by examiner

SYSTEM AND METHOD FOR PROACTIVE COMMUNICATION NETWORK MANAGEMENT BASED UPON AREA OCCUPANCY

BACKGROUND OF INVENTION

The invention involves the proactive diagnosis of load and interference (e.g. radio, load) placed on a communication network and/or distributed system through detection of the occupancy of certain people and/or devices present within the area covered by the system.

In the current state of the art, network and other distributed systems are used in various settings to provide voice and data communication and/or connectivity to the devices and people within the coverage area of the system. These systems enable various electronic devices to connect to the system and send and receive voice and data communications via the system.

While the particular system employed at any given location is designed with the number and types of devices to be handled by the network during normal parameters, the system capabilities are also designed to handle increased loads above the perceived "normal" usage. This is accomplished by providing the system with an overall or built-in capacity or band-width above the predetermined "normal" usage or load that is expected to be placed on the system to accommodate the times of increased usage.

In addition, these systems are also configured to self-diagnose problems that occur within the system, such as situations where one or more components of the system fails or otherwise becomes inoperable. With systems of this type, the system can diagnose the source of the problem and subsequently repair or address the problem in an automated manner, such as by rerouting signals through available stand-by system components.

In performing these automatic diagnostic functions, the system is reactive with respect to failure modes occurring in the system, i.e., the system will diagnose and address a problem after the problem has been detected by the system. As a result, these systems necessarily have some effective downtime, even if the systems can employ a stand-by component, as the designed full capacity of the system is not available until the problem has been remedied.

Further, with the quantity of mobile devices being carried by individuals in virtually any setting, radio interference from these mobile devices can cause issues with communication between the system and low power devices located within the system coverage area. Also, the volume of information (i.e., data and voice) being handled in the system coverage area due to usage of items such as mobile devices and voice over internal Protocol (VoIP) phones, which can include data downloading and streaming, as well as other uses, can also place undue burden on the bandwidth for the system.

In prior art systems, the usage of the system can be detected and accommodated for by the system. However, these systems are only be reactive to the detected demands on the bandwidth of the system. As such, while the system is operating to adjust the ability of the system to accommodate the increased usage, this delay can result in loss of any information sought to be obtained through the system.

Accordingly, it is desirable to develop a communication network and/or system that is capable of proactively diagnosing the coverage and corresponding potential usage of the bandwidth of the system, in order to accommodate increased demand on the system.

BRIEF DESCRIPTION OF THE INVENTION

There is a need or desire for a system and method to detect and adjust for the increased usage of a communication network or system prior to the actual increase in usage of the system to avoid system downtime and/or repair. The above-mentioned drawbacks and needs are addressed by the embodiments described herein in the following description.

According to one exemplary aspect of the invention, a communication network or system is provided with the capability for proactive adjustment of system parameters to maintain maximum uptime for critical systems or devices within the coverage area. This network or system utilizes various types of recognition technology to detect the current occupancy of people and/or devices within a coverage area for the system. Based on this determination the system proactively adjusts various parameters of the system in order to accommodate for the projected increased usage of the system as determined by the occupancy within the coverage area.

According to another aspect of an exemplary embodiment of the invention, the method of operation of the system to proactively accommodate increased demand on the system can take the form of activating various soft-network devices connected to the system and/or increasing power output with regard to particular wired and/or wireless devices in order to maintain or increase the performance of the selected wireless devices on the system.

According to still another aspect of one exemplary embodiment of the invention, a communication network management system includes a central processing unit (CPU), an individual and device recognition analysis engine operably connected to the CPU within within or remotely connected to the system on computer-readable-medium having the analysis instructions stored therein, a recognition device operably connected to the CPU and analysis engine and a transceiver configured to transmit and receive wired and/or wireless signals between the CPU and various patient care devices located within a coverage area defined by the transceiver, wherein the analysis engine is configured to determine an occupancy of the various devices and individuals within the coverage area.

According to still a further aspect of one exemplary embodiment of the invention, a method for determining the adequacy of a network communication system configuration, the method comprising the steps of providing a communication network management system including a central processing unit (CPU) having an individual and device recognition analysis engine located within the system on computer-readable-medium having the analysis instructions stored thereon in a non-transitory manner, a recognition device operably connected to the CPU and a transceiver configured to transmit and receive wired and/or wireless signals between the CPU and various patient care devices located within a coverage area defined by the transceiver; transmitting information from the recognition device to the analysis engine concerning the individuals and devices present in the coverage area; determining the occupancy of individuals and devices within the coverage area and determining the adequacy of a current configuration of the communication network based on the occupancy of the individuals and devices within the coverage area.

According to still a further aspect of one exemplary embodiment of the invention, a communication network management system includes a central processing unit (CPU) including an individual and device recognition analysis engine located within the system on computer-readablemedium having the analysis instructions stored thereon in a non-transitory manner, a database operably connected to the CPU and containing data concerning recognizable individuals and devices, a recognition device operably connected to the CPU and analysis engine and configured to supply recognition information to the analysis engine, a transceiver configured to transmit and receive wired and/or wireless signals between the CPU and various patient care devices located within a coverage area defined by the transceiver and a software switch operably connected to the CPU and configured to be selectively activated by the CPU, wherein the analysis engine is configured to determine an occupancy of the various devices and individuals within the coverage area.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The drawings illustrate the best mode presently contemplated of carrying out the disclosure.

DETAILED DESCRIPTION OF THE DRAWINGS

Figure 1:
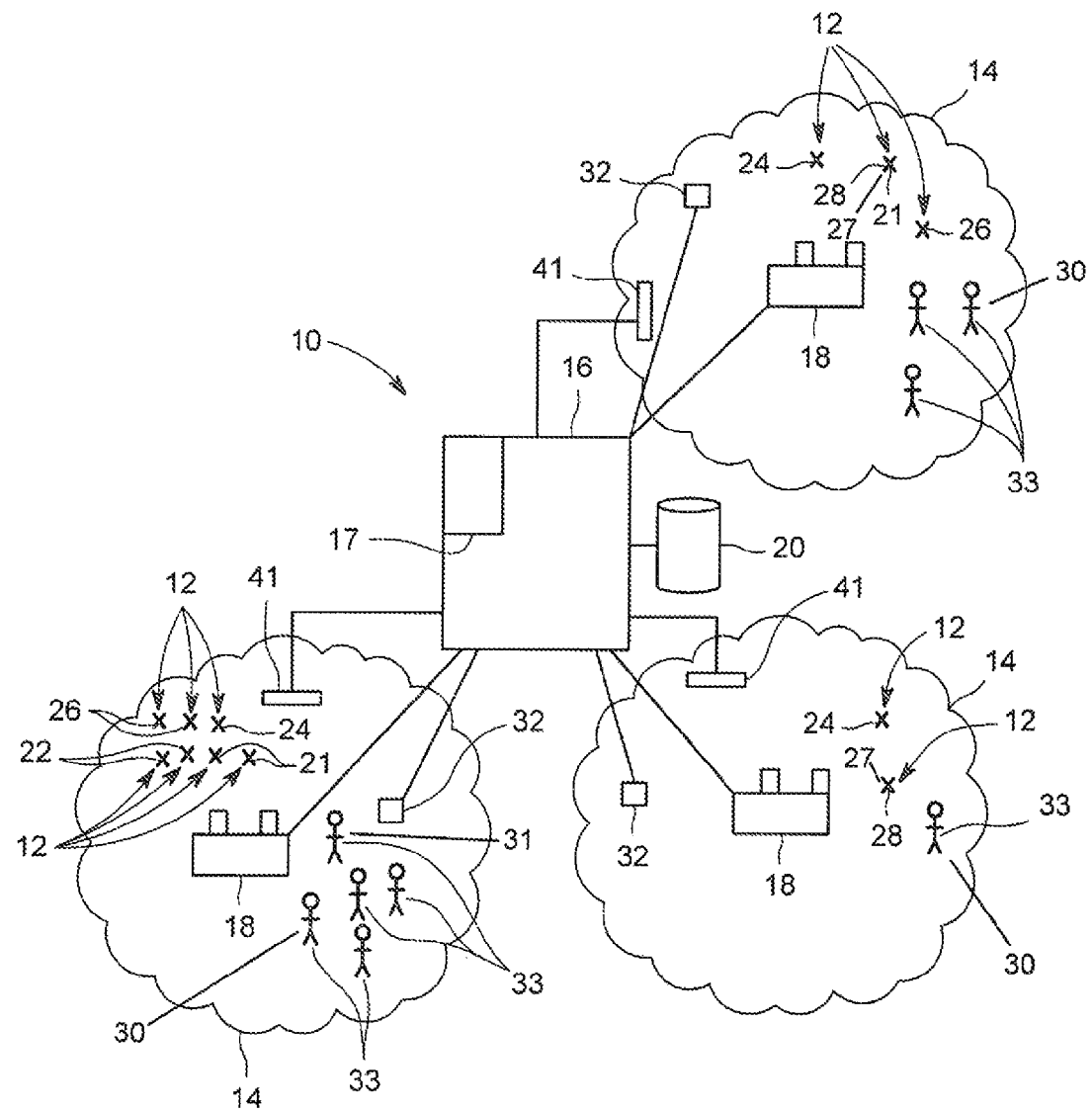
FIG. 1 is a schematic representation of a communication network monitoring system according to an exemplary embodiment of the invention.

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Further, the foregoing summary, as well as the following detailed description of certain embodiments, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentality shown in the drawings.

FIG. 1 illustrates a schematic view of a network communications and management system 10 operable to provide wired and/or wireless data transmission to various devices 12 within the coverage area 14 defined by the system 10 in accordance with one exemplary embodiment of the invention, such as that disclosed in co-owned U.S. Pat. No. 8,199,000 B2 entitled System And Method For Interference Mitigation In A Wireless Sensor Network, U.S. Pat. No. 8,315,224 B2 entitled Methods And Systems For Reuse Of Radio Resources In Medical Telemetry Networks, and U.S. Pat. No. 8,488,499 B2 entitled System And Method Of Enhanced Quality Of Service Of Wireless Communication Based On Redundant Signal Reception On Two Or More Antenna Diversity Inputs, the entirety of which are each expressly incorporated by reference herein for all purposes.

The system 10 facilitates wired and/or wireless data transmission between the devices 12 and the system 10, where the system 10 can be configured where the system logic and/or commands is physically spread through numerous system components, which can include, but is not limited to, a central processing unit (CPU) 16. In the exemplary embodiment of FIG. 1, the CPU 16 can optionally subsequently direct the data transmissions to a separate communication system (not shown) that is connected to the system 10 via a separate wired or wireless connection or can store the information or data received from the devices 12, such as that disclosed in U.S. Pat. No. 7,129,836 B2 entitled Wireless Subject Monitoring System, the entirety of which is expressly incorporated by reference herein for all purposes.

In the exemplary embodiment illustrated in FIG. 1, the system 10 is employed as a communication network in a hospital, or other medical/patient care facility, such as a clinic, nursing home, etc, such as on a specified floor, wing or other subset of the hospital building. The system 10 includes the central processing unit (CPU) 16, a number of signal transceivers/routers 18 operably connected to the CPU 16 and configured to wirelessly send and receive signals from a number of patient care devices 12 disposed within the coverage area 14 defined by the transceivers/routers 18, and a database 20 operably connected to the CPU 16 and configured to store data relating to the signals received by the CPU 16 and to retain relevant information pertaining to the operation of the system 10.

The devices 12 disposed within the coverage area 14 that are capable of transmitting and receiving wired and/or wireless signals from the CPU 16 via the transceivers 18 can include, among others, patient monitoring devices 21, desktop or laptop computers 22, tablet computers 24, mobile phones 26, and/or other wired and/or wireless voice/data communication devices 27, such as specialized hospital personnel notification devices 28. The devices 12 classified as patient care devices 12 for use with the system 10 can include, but are not limited to, medical patient care devices, such as anesthesia machines, ventilators, and/or patient monitoring devices 21, among others, desktop or laptop computers 22 present in the coverage area 14, tablet computers 24 carried by medical personnel 31 within the coverage area 14, and/or other wireless voice/data communication devices 27, such as specialized hospital personnel notification devices 28. Each of these types of devices 12 when connected to the system 10 can transmit data signals that are received by one or more of the transceivers 18 and routed to the CPU 16. The router 18 and/or CPU 16 then directs the signal as appropriate depending upon the device 12 and type of signal sent from the particular device 12.

In an exemplary embodiment, a signal sent from a monitoring device 21 concerning the condition of a patient 30 to which the monitoring device 21 is connected is sent to the CPU 16. At the CPU 16 the signal can be stored in an appropriate electronic storage medium location, such as within the database 20, to enable comparison of the signal with other prior or subsequently received signals regarding the condition of the particular patient 30, and/or can be routed to a notification device 28 associated with the medical personnel/physician 31 caring for that patient 30 as an alert of the present condition of the patient 30.

In order to facilitate the clear transmission of the signals from the monitoring devices 21 to the CPU 16, the system 10 also includes a number of recognition devices 32 disposed throughout the coverage area 14. The recognition devices 32 are configured to detect, distinguish and recognize or identify various individuals 33, such as patients 30, medical personnel/physicians 31 and other unclassified individuals 33 and the various devices 12 that are present within the coverage area 14. In the exemplary embodiment illustrated in FIG. 1, the recognition devices 32 are cameras 34 disposed at various locations within the coverage area 14. The cameras 34 are operably connected to the CPU 16 and are capable of transmitting visual images of the individuals 30,31,33 and devices 12 present in the sections of the coverage area 14 encompassed by the field of view 37 of the camera 34. The images that are transmitted to the CPU 16 are analyzed by a suitable individual and device recognition analysis engine 17 which can be located within the system 10 or remotely from the system 10, on a computer-readable-medium having the analysis instructions stored thereon in a non-transitory manner either directly on or in connection with the CPU 1.6. The analysis engine 17 compares the images to data on individuals 30,31,33 and devices 12 to be recognized, such as may be stored in the database 20 connected to the CPU 16, in order to detect the number and types of individuals 30,31,33 and devices 12 occupying the viewing area or field 37 of the particular camera 34, e.g., a patient room 36 or hallway 38. Other types of recognition systems that can be utilized alternatively to or in conjunction with the image recognition employed by the analysis engine 17 can include any real time location system (RTLS), including, but not limited to ultra-wide radar, radio frequency identification (RFID) and/or WiFi recognition systems, such as those disclosed in one or more of U.S. Pat. No. 7,920,061 B2 entitled Controlling An Alarm State Based On The Presence Or Absence Of A Caregiver In A Patient's Room, U.S. Pat. No. 8,258,965 B2 entitled System For Monitoring Caregivers And Equipment At A Patient Location, U.S. Pat. No. 9,092,834B2 entitled System and Method For Automatically Adjusting Medical Displays and U.S. Pat. No. 6,600,421 B2 entitled System To Automatically Locally Control A Device According To Preferences Of A User Entering A Local Area Of The Device From A Remote Area, the entirety of which are each expressly incorporated by reference herein for all purposes.

In performing the analysis for the individuals 30,31,33 present, the CPU 16/analysis engine 17 determines the number of individuals 30,31,33 present in the field of view 37 of the camera 34. In making this determination, the CPU 16/analysis engine 17 also identifies certain individuals 30,31,33 by identifying particular features 40 of those individuals 30,31,33 in order to additionally classify the types of individuals 30,31,33 that are present. These identifying features can be facial recognition or particular tags, nameplates, or other identifying items located on the body or clothing of an individual 30,31,33. By locating these identifying features 40, the system 10 can determine the number of individuals 30,31,33 present in the viewing area, as well as the roles or function of each of the individuals 30,31,33. The CPU 16/analysis engine 17 also can include the ability to recognize if individuals 30,31,33 are entering or exiting the coverage area 14 of the system 10 and can also include information or certain subsets of individuals 30,31,33 (e.g., particular types of medical personnel 31) and/or devices 12 (e.g., certain types of patient care or monitoring devices 21) that are known to historically utilize more network resources, and thus require additional capacity when occupying a coverage area 14.

The CPU 16/analysis engine 17 is also configured to identify the number and types of devices 12 present in the viewing area. As such, the CPU 16/analysis engine 17 can determine the number of patient monitoring devices 21, desktop or laptop computers 22, tablet computers 24, mobile phones 26, and/or other wireless voice/data communication devices 27, such as specialized hospital personnel notification devices 28. This analysis can also be facilitated by the analysis of the individuals 30,31,33 present in the viewing area 37, as certain types of individuals 30,31,33, such as medical personnel 31, can optionally assumed to be carrying certain types and numbers of devices 12, such as specialized hospital personnel notification devices 28.

Figure 2:
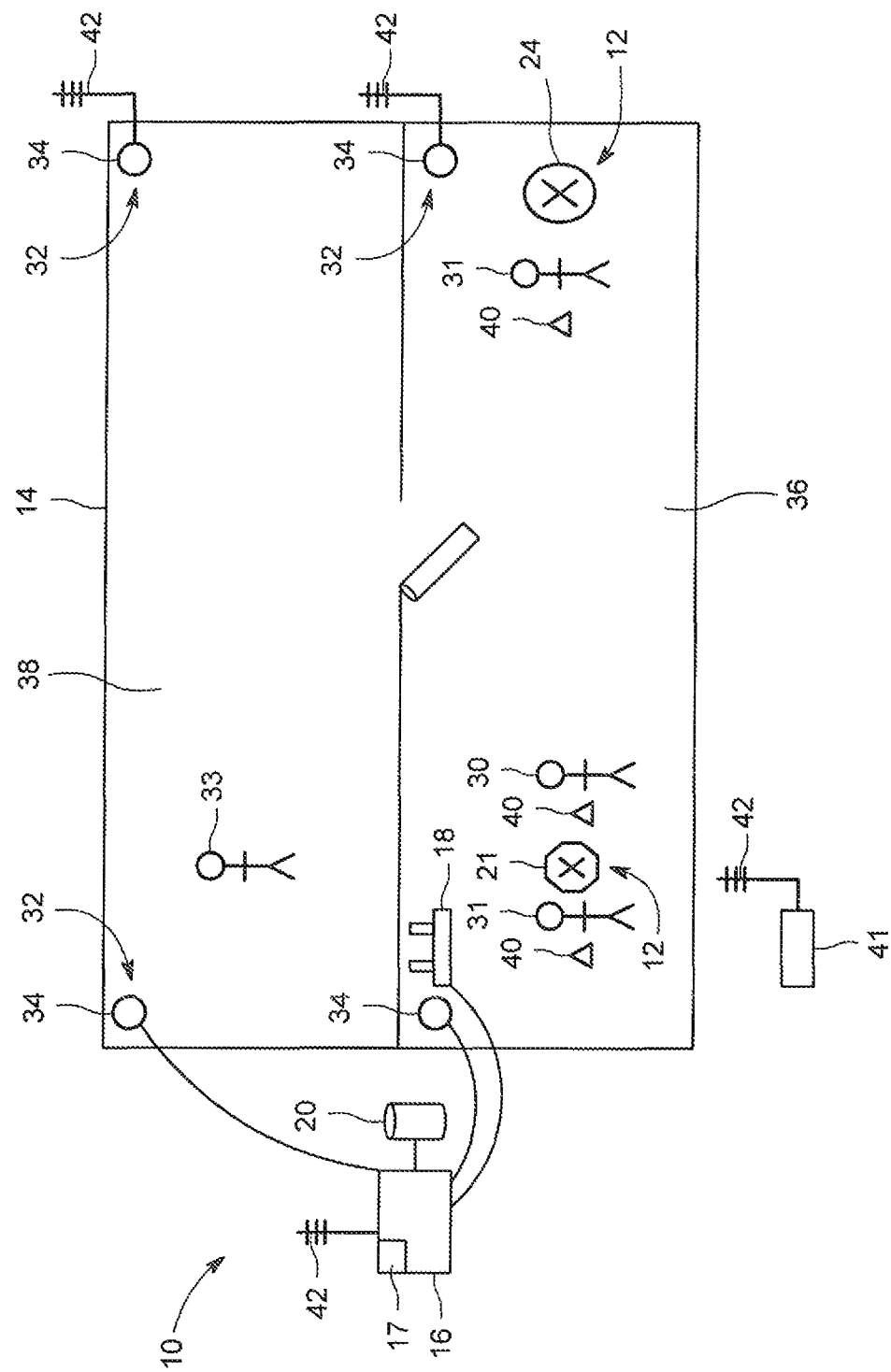
FIG. 2 is a schematic representation of a communication network monitoring system according to another exemplary embodiment of the invention.

In the exemplary embodiment of FIG. 2, the coverage area 14 of the system 10 includes a hallway 38 and a room 36. The room 36 and hallway 38 each include a pair of recognition devices 32 in the form of cameras 34 that are operably connected to the CPU 16/analysis engine 17 of the system 10 such as by wired connection or wireless connections, such as by utilizing antennas 42. A transceiver/router 18 is also disposed within the room 36 in order to facilitate communication between the devices 12 and the CPU 16 present in the section of the coverage area 14 in which the router 18 is disposed.

Figure 4:
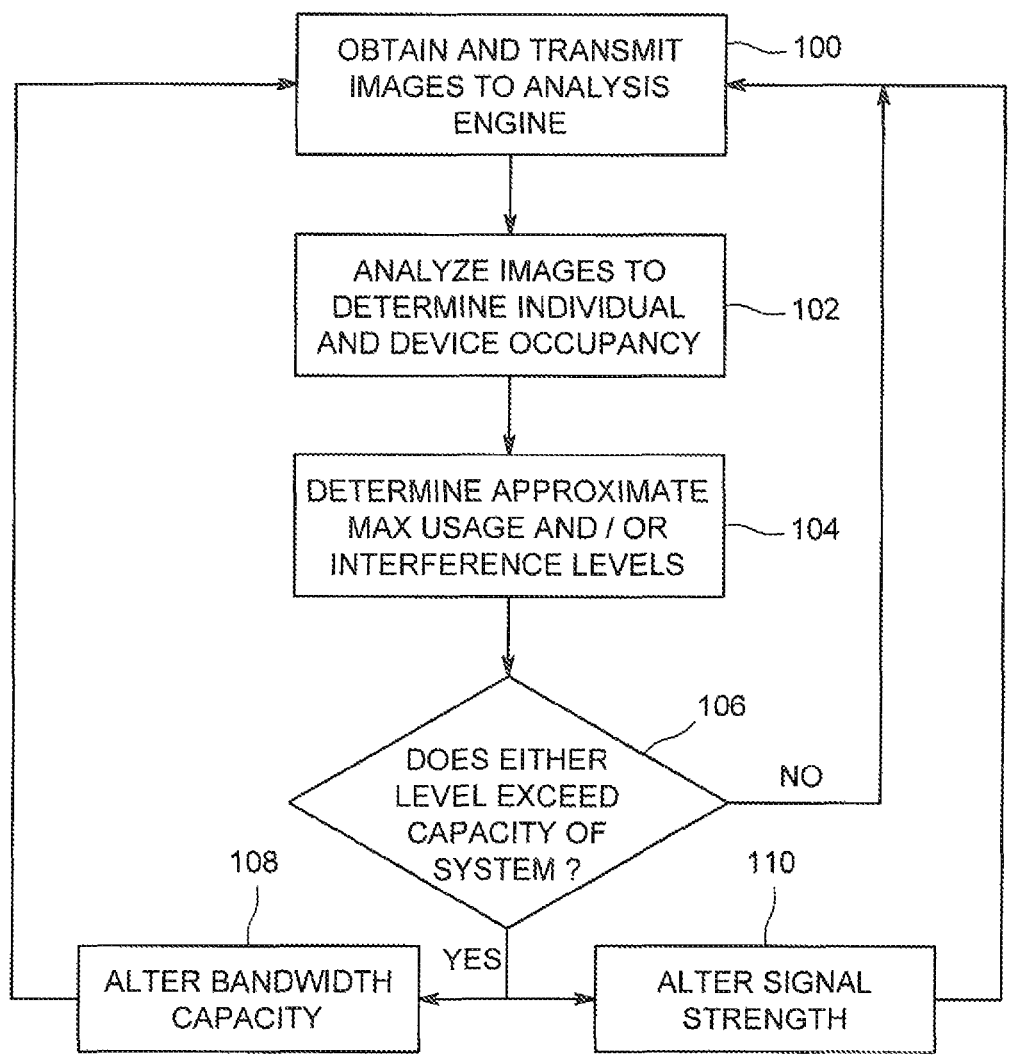
FIG. 4 is a flowchart of the method of operation of the communication network monitoring system according to an exemplary embodiment of the invention.

The cameras 34 are operated in the exemplary embodiment of FIG. 2 in the method of FIG. 4 to identify the individuals 30,31,33 present in the field of view 37 of each camera 34. Initially, in block 100, images from the cameras 34 are transmitted to the CPU 16/analysis engine 17 for analysis in block 102 to determine number and type of individuals 30,31,33 present in the images and/or the number and type of devices 12 present in the images. With this information, in block 104 the system 10 via the CPU 16/analysis engine 17 can then determine or approximate what a potential maximum usage of the system 10 would be in view of the total number of individuals 30,31,33 and devices 12, and whether the present configuration of the system 10 is able to accommodate that usage. In addition, in block 104 using the same information the CPU 16/analysis engine 17 can determine the maximum potential interference presented by the types and number of devices 12 present in the images in order to determine whether the current signal strength provided by the system 10 can readily overcome the maximum interference provided by the devices 12. If the CPU 16/analysis engine 17 determines in decision block 106 that the current system 10 configuration is acceptable, no changes are made and the system 10 returns to block 100 to perform another analysis, such as after a predetermined period of time.

However, if in decision block 106 the CPU 16/analysis engine 17 determines the current configuration and/or the predicted state of the system 10 is insufficient to handle the maximum usage and/or interference that could occur with the current occupancy of the coverage area 14, then the CPU 16/analysis engine 17 can proceed to proactively alter the configuration of the system 10 in one or both of block 108 to increase (or decrease) the bandwidth or block 110 to increase (or decrease) signal strength, among other parameters alternation or modifications that can be made by the system 10 to accommodate for those potential levels of system usage or interference with system signals prior to the actual usage of the system 10 or the interference with system signals reaching those maximum levels. Once altered, the system 10 then proceeds back to block 100 to perform another analysis, such as after a predetermined period of time.

Using this method, and looking again at FIG. 2, the cameras 34 disposed in the hallway 38 send images that are used by the CPU 16/analysis engine 17 to identify one (1) unclassified individual 33 (no facial recognition or other known identifying features on the individual) with no devices 12. The images from the cameras 34 in the room 36 are used by the CPU 16/analysis engine 17 to identify a patient 30 (either by facial recognition or certain identifying features) and two (2) medical personnel 31 (using both facial recognition and identifying features). In addition, the cameras 34 in the room 36 identify two (2) devices 12 in the form of a patient monitoring device 21 and a tablet computer 24.

With this information, the CPU 16/analysis engine 17 can then conduct a separate analysis of whether the capacity of the router 18 and the system 10 overall is sufficient in the current configuration of the system 10 to accommodate the usage of the network/system 10 by all of the individuals 30,31,33 and devices 12 present in the coverage area 14 and to overcome any interference by non-patient care devices, such as mobile phones 26. If the CPU 16 determines that the current capacity/bandwidth provided by the router 18 and overall system 10 is sufficient, as would be the case in the exemplary embodiment of FIG. 2, the CPU 16/analysis engine 17 will leave the system 10 in its current configuration.

Figure 3:
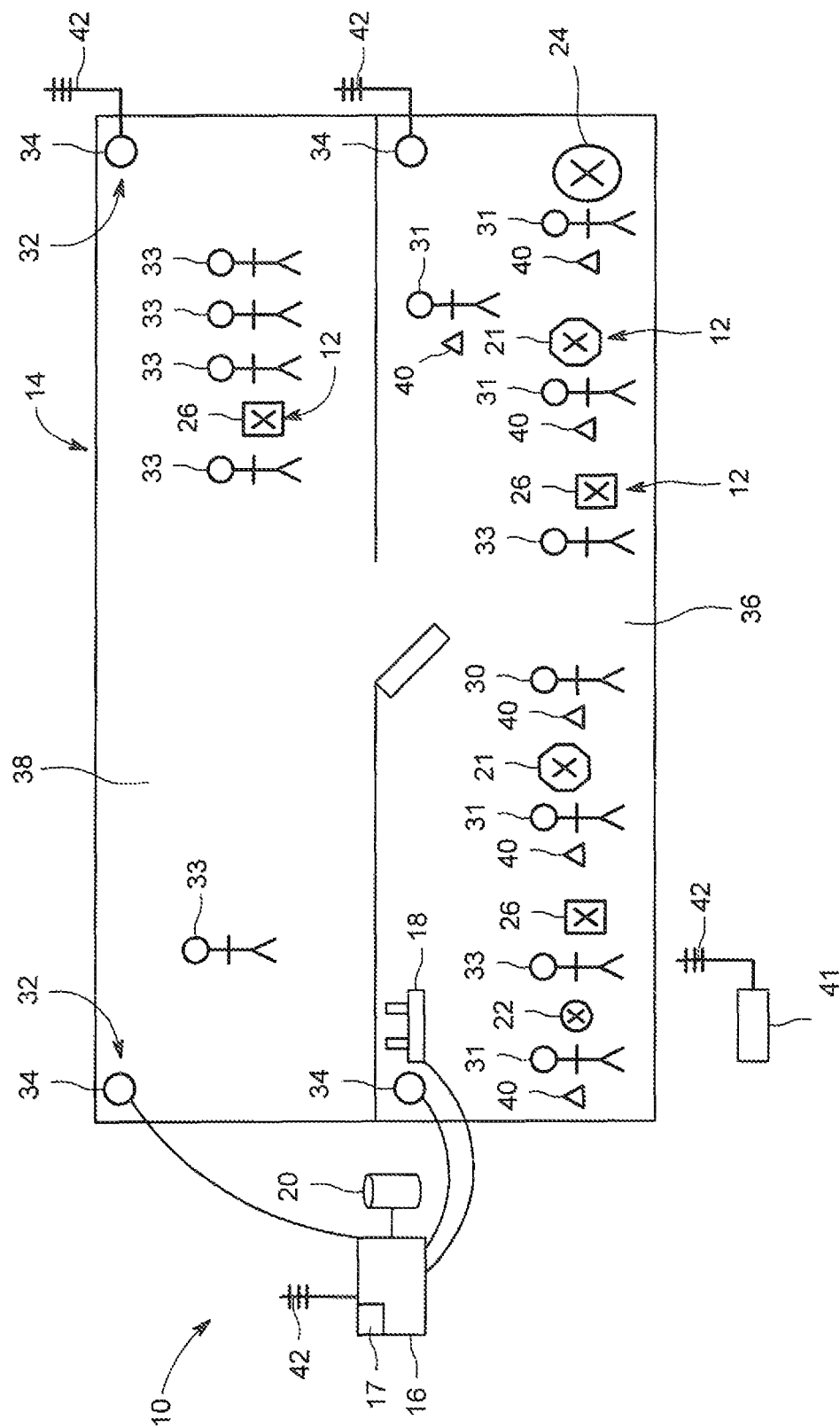
FIG. 3 is a schematic representation of a communication network monitoring system according to still another exemplary embodiment of the invention.

Referring now to the exemplary embodiment illustrated in FIG. 3, in a separate situation for the same the coverage area 14, or portion thereof, the cameras 34 disposed in the hallway 38 send images that are used by the CPU 16/analysis engine 17 to identify five (5) unclassified individuals 33 (no facial recognition or other known identifying features on the individuals) with one (1) device 12 in the form of a laptop computer 24. Further, images from the cameras 34 in the room 36 are used by the CPU 16/analysis engine 17 to identify a patient 30 (either by facial recognition or certain identifying features), five (5) medical personnel 31 (using both facial recognition and identifying features) and two (2) unclassified individuals 33 (no facial recognition or other known identifying features on the individuals). In addition, the images from the cameras 34 in the room 36 are used to identify multiple devices 12 in the form of two (2) patient monitoring devices 21, a desktop computer 22, a tablet computer 24 and two (2) mobile phones 26.

With this information, the CPU 16/analysis engine 17 can then conduct a separate analysis of the capacity of the router 18 and/or the system 10 to accommodate the usage of the network/system 10 by all the individuals 30,31,33 and devices 12 present in the coverage area 14. Based on the recognition information obtained by the system 10, the system 10 can determine the usage of the system 10, which is different for each of the different types of devices 12 present in the coverage area 14, and is also different for different types of individuals, such as clinicians 31 and visitors 33, and further different for various types clinicians 31, such as doctors, nurses, respiratory therapists, and others. The system 10 is able to assess the potential usage by each of these various types of devices 12 and individuals 30,31,33, as well as to optionally adapt and learn and/or characterize the usage of different devices 12 and individuals 30,31,33, such as the usage behavior of different individual clinicians 31 and store them to more accurately determine the potential usage of the system 10 when these clinicians 31 are present in the network area 14. In the exemplary embodiment of FIG. 3, due to the increase occupancy of individuals 30,31,33 and devices 12 within the coverage area 14, the CPU 16/analysis engine 17 can proactively determine that the current capacity/bandwidth provided by the router 18 and overall system 10 is insufficient for various reasons, such as the presence of a larger amount of network usage from mobile phone 26 that are now present in the coverage area 14. The CPU 16/analysis engine 17 can consequently make adjustments to the network system 10, and the individual components 18,41 thereof, to provide better transmission quality to and from the system 10 for patient monitoring devices 21 and other patient care devices 12, such as the desktop computer 22 and the tablet computer 24 carried by the medical personnel 31. In one exemplary embodiment, the CPU 16/analysis engine 17 can alter a medical telemetry transceiver, such as router 18 and/or monitoring device 21, to transmit a communication signal received only by the patient care devices 12, such as patient monitoring devices 21, patient room desktop computers 22 and tablet computer 24 carried by the medical personnel 31, at a higher power or using another altered communication algorithm to overcome the interference presented by the number of non-medical/non-patient care devices 12 present, such as tablet computers 24 carried by non-medical personnel 31 and mobile phones 26, where a lower power output for the medical device 21 would be advantageous from a battery usage perspective. Additionally, separate network resources or components, such as bridges, soft switches 41, or routers 18, including but not limited to those tasked to cover other sections the coverage area 14 that are currently under capacity, may also be allocated to increase or decrease the available bandwidth of the system 10 in the coverage area 14 to handle the increased or decreased network load in the affected section coverage area 14. In addition, the system 10 can be utilized to assess and adjust the number and types of patient care device 12 and medical personnel 31 in the coverage area 14, thereby adjusting the adequacy of the coverage area 14 to handle the activity occurring within the coverage area 14.

Further, upon making a subsequent analysis or determination of the coverage area 14, the CPU 16/analysis engine 17 can determine that the occupancy of the devices 12 and/or individuals 30,31,33 within the coverage area 14 has dropped to a level at which the increased signal power for the medical telemetry transceiver 18,21 to normal levels and/or deactivate one or more of the soft switches 41.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A communication network management system comprising:
   a central processing unit (CPU);
   an individual and device recognition analysis engine operably connected to the CPU within the communication network management system on computer-readable-medium having the analysis instructions stored therein;
   a recognition device operably connected to the CPU and the analysis engine; and
   a transceiver configured to transmit and receive signals between the CPU and various patient care devices located within a coverage area defined by the transceiver, wherein the analysis engine is configured to determine an occupancy of the various patient care devices and individuals within the coverage area.

2. The communication network management system of claim 1, wherein the recognition device is a camera configured to obtain images of individuals and devices within the coverage area.

3. The communication network management system of claim 2, further comprising multiple cameras disposed within the coverage area, each camera operably connected to the CPU and configured to obtain images of individuals and devices within the coverage area.

4. The communication network management system of claim 1, wherein the individual and device recognition analysis engine is configured to recognize and distinguish between various types of devices present in the coverage area.

5. The communication network management system of claim 4, wherein the individual and device recognition analysis engine is configured to recognize and distinguish between patient care devices and non-patient care devices present in the coverage area.

6. The communication network management system of claim 5, wherein the patient care devices comprise patient monitoring devices, desktop or laptop computers, tablet computers and specialized hospital personnel notification devices.

7. The communication network management system of claim 1, wherein the individual and device recognition analysis engine is configured to recognize and distinguish between various types of individuals present in the coverage area.

8. The communication network management system of claim 7, wherein the individual and device recognition analysis engine is configured to recognize and distinguish between patients, medical personnel and other non-medical individuals present in the coverage area.

9. The communication network management system of claim 1, further comprising a soft switch operably connected to the CPU and capable of being activated by the CPU.

10. A method for determining the adequacy of a network communication system configuration, the method comprising the steps of:
    providing a communication network management system including a central processing unit (CPU) having an individual and device recognition analysis engine located within the network communication system on computer-readable-medium having the analysis instructions stored thereon in a non-transitory manner, a recognition device operably connected to the CPU and a transceiver configured to transmit and receive wireless signals between the CPU and various patient care devices located within a coverage area defined by the transceiver;
    transmitting information from the recognition device to the analysis engine concerning the individuals and devices present in the coverage area;
    determining the occupancy of individuals and devices within the coverage area; and
    determining the adequacy of a current configuration of the communication network based on the occupancy of the individuals and devices within the coverage area.

11. The method of claim 10, wherein the recognition device is a camera and wherein step of transmitting information from the recognition device to the analysis engine comprises transmitting images to the recognition device.

12. The method of claim 11, wherein the step of determining the occupancy of individuals and devices within the coverage area comprises:
    determining a number and type of each of a number of different types of devices in the images; and
    determining a number and type of each of a number of different types of individuals in the images.

13. The method of claim 10, wherein the step of determining the adequacy of a current configuration of the communication network comprises the steps of:
    determining a potential maximum usage of the network based on the occupancy of the individuals and devices within the coverage area.

14. The method of claim 10, wherein the step of determining the adequacy of a current configuration of the communication network comprises the steps of:
    determining a potential maximum interference with network signals based on the occupancy of the individuals and devices within the coverage area.

15. The method of claim 10, further comprising the step of altering the configuration of the communication network.

16. The method of claim 15, wherein the step of altering the configuration of the communication network comprises altering a signal strength of the transceiver.

17. The method of claim 15, wherein the step of altering the configuration of the communication network comprises altering a signal strength of a patient care device within the coverage area.

18. The method of claim 15, wherein the step of altering the configuration of the communication network comprises connecting a software switch to the network to increase the bandwidth of the network configuration.

19. The method of claim 15, wherein the step of altering the configuration of the communication network comprises disconnecting a software switch to the network to decrease the bandwidth of the network configuration.

20. A communication network management system comprising:
    a central processing unit (CPU) including an individual and device recognition analysis engine located within the communication network management system on computer-readable-medium having the analysis instructions stored thereon in a non-transitory manner;
    a database operably connected to the CPU and containing data concerning recognizable individuals and devices;
    a recognition device operably connected to the CPU and analysis engine and configured to supply recognition information to the analysis engine;
    a transceiver configured to transmit and receive wireless signals between the CPU and various patient care devices located within a coverage area defined by the transceiver; and a software switch operably connected to the CPU and configured to be selectively activated by the CPU, wherein the analysis engine is configured to determine an occupancy of the various devices and individuals within the coverage area.

* * * * *